United States Patent
Chen

(10) Patent No.: US 7,930,140 B2
(45) Date of Patent: Apr. 19, 2011

(54) SYSTEM AND METHOD FOR MONITORING VARIABLE PARAMETERS OUT OF WORKING PARAMETERS OF PROCESSING MACHINE

(75) Inventor: Shen-An Chen, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 203 days.

(21) Appl. No.: 12/275,220

(22) Filed: Nov. 21, 2008

(65) Prior Publication Data

US 2010/0100201 A1   Apr. 22, 2010

(30) Foreign Application Priority Data

Oct. 16, 2008   (CN) .......................... 2008 1 0304944

(51) Int. Cl.
*G06F 11/30*   (2006.01)
*G06F 11/32*   (2006.01)

(52) U.S. Cl. ........... 702/182; 702/187; 702/188; 700/67

(58) Field of Classification Search .................. 702/182, 702/187, 188
See application file for complete search history.

(56) References Cited

U.S. PATENT DOCUMENTS

| | | | | |
|---|---|---|---|---|
| 5,423,199 | A  * | 6/1995 | Mangrulkar | 72/3 |
| 2003/0105535 | A1* | 6/2003 | Rammler | 700/17 |
| 2007/0294040 | A1* | 12/2007 | Galt | 702/34 |
| 2009/0080040 | A1* | 3/2009 | Lieberman | 358/504 |

* cited by examiner

*Primary Examiner* — Hal D Wachsman
(74) *Attorney, Agent, or Firm* — Zhigang Ma

(57) ABSTRACT

A system for monitoring variable parameters out of working parameters of a processing machine includes a selecting module, a frequency updating module, a first communicating module, a central processing unit (CPU), and a value processing module. The selecting module selects a number of variable parameters out of working parameters of the processing machine. The frequency updating module sets an updating frequency of the selected variable parameters according to the number of the selected variable parameters. The first communicating module converts the selected variable parameters into appointed formats. The CPU receives the converted variable parameters at the updating frequency, and gather the values of the received variable parameters. The value processing module receives the values of the selected variable parameters, and transforms the values of the selected variable parameters to display formats for presentation.

19 Claims, 2 Drawing Sheets

SYSTEM AND METHOD FOR MONITORING VARIABLE PARAMETERS OUT OF WORKING PARAMETERS OF PROCESSING MACHINE

BACKGROUND

1. Technical Field

Embodiments of the present disclosure relate to monitoring systems and methods and, particularly, to a system and a method for monitoring variable parameters out of working parameters of a processing machine.

2. Description of the Related Art

For industrial control processes, human machine interfaces (HMIs) are used for monitoring and modifying the working parameters of industrial machines like processing machines, motor etc. The working parameters of a processing machine include variables parameters, such as the rotate speed, the torque of a motor of the processing machine, which are normally monitored by users via a screen of the HMI. Unfortunately, users may not be able to monitor and modify the variable parameters in time if a great number of the variable parameters are being processed and displayed by the HMI, which may cause production problems.

What is needed, therefore, is to provide system and method for monitoring variable parameters, to overcome the above-mentioned shortcoming.

DETAILED DESCRIPTION

Figure 1:
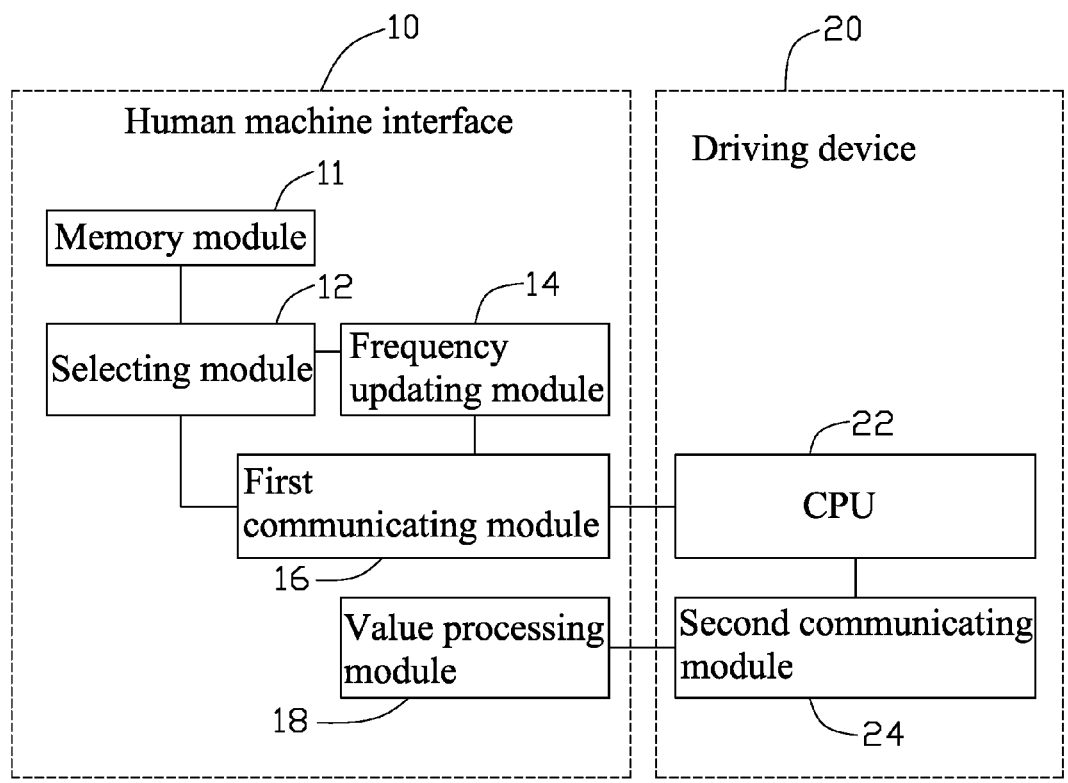
FIG. 1 is a functional step diagram of one embodiment of a system for monitoring variable parameters of a processing machine.

Referring to FIG. 1, one embodiment of a system 1 for monitoring variable parameters of a processing machine (not shown) includes a memory module 11, a selecting module 12, a frequency updating module 14, a first communicating module 16, a value processing module 18, a central processing unit (CPU) 22, and a second communicating module 24. The memory module 11, the selecting module 12, the frequency updating module 14, the first communicating module 16, and the value processing module 18 are located in a human machine interface (HMI) 10 of the processing machine. The CPU 22 and the second communicating module 24 are located in a driving device 20 of the processing machine. The memory module 11, the selecting module 12, the first communicating module 16, the CPU 22, the second communicating module 24, and the value processing module 18 are connected in series. An input terminal of the frequency updating module 14 is connected to the selecting module 12. An output terminal of the frequency updating module 14 is connected to the first communicating module 16.

The memory module 11 stores the variable parameters of the processing machine. The selecting module 12 is controlled by a user interface of the HMI 10, and is configured to select a number of the variable parameters. The frequency updating module 14 changes or sets an updating frequency of the selected variable parameters via the user interface. A higher updating frequency is obtained upon the condition that the number of the selected variable parameters is decreased. The selected variable parameters are converted into predetermined formats by the first communicating module 16. The converted variable parameters are transmitted to the CPU 22 at the updating frequency set by the frequency updating module 14. Values of the selected variable parameters are gathered by the CPU 22, and are transmitted to the value processing module 18 via the second communicating module 24. The values of the selected variable parameters are processed by the value processing module 18, and are finally displayed on the HMI 10.

Figure 2:
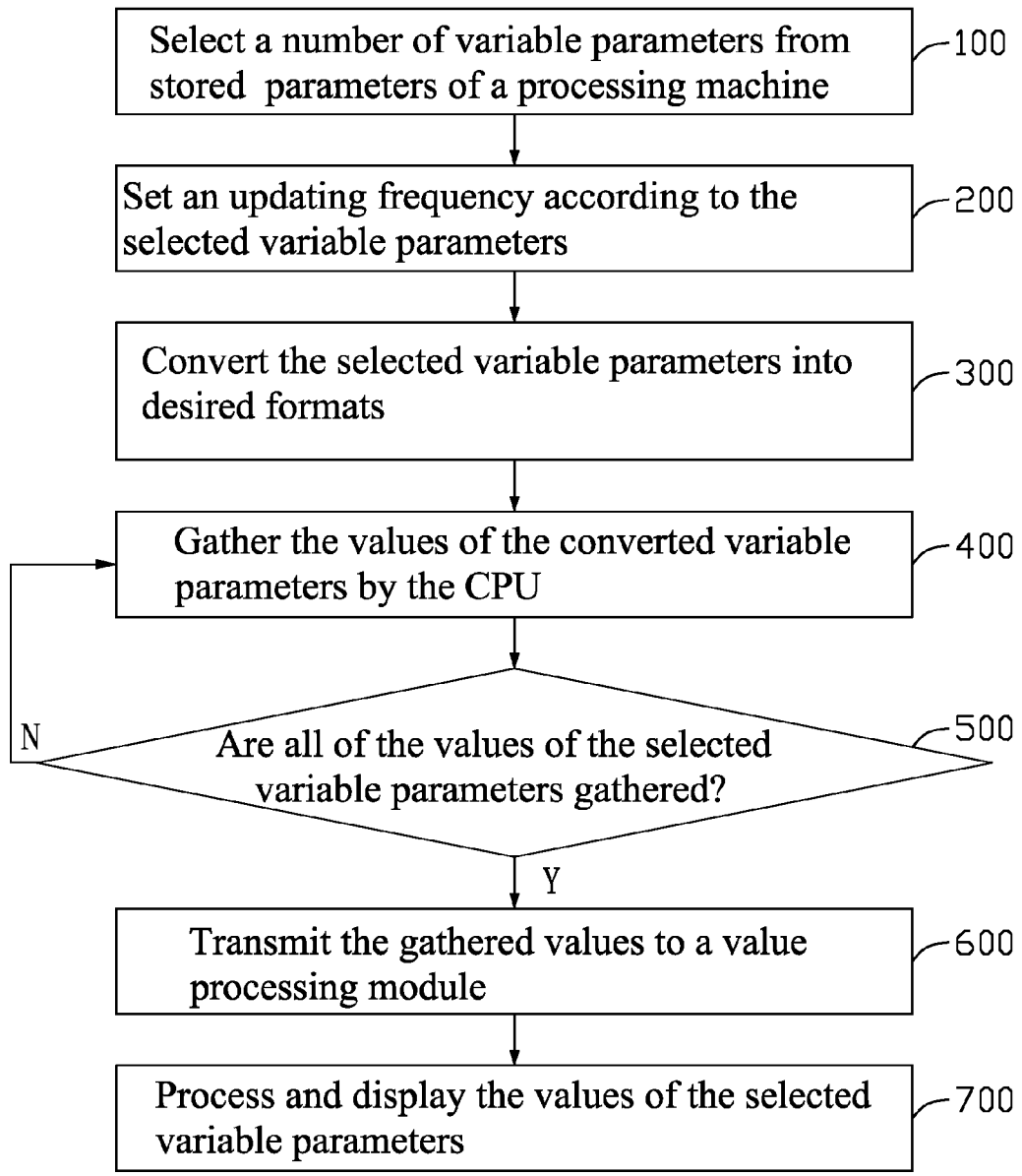
FIG. 2 is a flowchart of one embodiment of a method for monitoring the variable parameters of the processing machine.

Referring to FIG. 2, one embodiment of a method for monitoring variable parameters of the processing machine is used to observe and control the variable parameters of the processing machine by a user.

In step 100, a user interface is used to control the selecting module to select a number of the variable parameters from all of the working parameters of the processing machine stored in the memory module. The selected variable parameters may be especially important during the processing machine operations.

In step 200, the frequency updating module 14 sets an updating frequency of the selected variable parameters. A higher updating frequency could be set upon the condition that the number of the selected variable parameters is less than before.

In step 300, convert the selected variable parameters into predetermined formats, and transmit the converted variable parameters to the CPU 22, by the first communicating module 16. For example, the CPU 22 receives one of the converted variable parameters every two seconds upon the condition that the value of the updating frequency is equal to ½ times per second (tps).

In step 400, the values of the selected variable parameters are gathered by the CPU 22.

In step 500, determine whether all of the values of the selected variable parameters are gathered by the CPU 22. If the gather of all of the selected variable parameters values has completed, step 600 is executed. Otherwise, if there is any of the selected variable parameters values has not been gathered, the flow returns to step 400.

In step 600, values of all of the selected variable parameters are transmitted to the value processing module 18 from the CPU 22 via the second communicating module 24.

In step 700, processing and displaying the values of the selected variable parameters. Processing may, for example, include hexadecimal-to-decimal conversions. The processed values may be displayed on a screen of the HMI 10.

In this embodiment, the number of the selected variable parameters can be changed as desired at each time when setting the updating frequency. The number of the selected variable parameters can be unchangeable, therefore, without the need of using the user interface when a higher or lower updating frequency is unnecessary.

The foregoing description of the exemplary embodiments of the disclosure has been presented only for the purposes of illustration and description and is not intended to be exhaustive or to limit the disclosure to the precise forms disclosed. The embodiments were chosen and described in order to explain the principles of the disclosure and their practical application so as to enable others of ordinary skills in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A system for monitoring variable parameters out of working parameters of a processing machine, the system comprising:
- a selecting module configured to select a number of variable parameters out of working parameters of the processing machine;
- a frequency updating module configured to set an updating frequency of the selected variable parameters according to the number of the selected variable parameters;
- a first communicating module configured to convert the selected variable parameters into predetermined formats;
- a central processing unit (CPU) configured to receive the converted variable parameters at the updating frequency, and gather the values of the received variable parameters; and
- a value processing module configured to receive the values of the selected variable parameters, and transform the values of the selected variable parameters to display formats for presentation.

2. The system of claim 1, further comprising a human machine interface (HMI), in which the selecting module, the frequency updating module, the first communicating module, and the value processing module are located.

3. The system of claim 2, wherein the HMI comprises a user interface configured to control the selecting module to select the variable parameters of the processing machine.

4. The system of claim 2, wherein the HMI further comprises a screen configured to display the values of the selected variable parameters.

5. The system of claim 1, further comprising a second communicating module configured to transmit the values of the selected variable parameters from the CPU to the value processing module.

6. The system of claim 5, further comprising a driving device, the central processing unit and the second communicating module are located in the driving device.

7. A system for monitoring a processing machine, the system comprising:
- a memory module configured to store working parameters of the processing machine;
- a selecting module configured to select a number of variable parameters out of the stored working parameters from the memory module;
- a frequency updating module configured to modify an updating frequency of the selected variable parameters according to the number of the selected variable parameters;
- a first communicating module configured to convert the selected variable parameters into predetermined formats;
- a central processing unit (CPU) configured to gather the values of the selected variable parameters; and
- a value processing module configured to receive, and transform the values of the selected variable parameters to display formats for presentation.

8. The system of claim 7, further comprising a human machine interface (HMI), in which the memory module, the selecting module, the frequency updating module, the first communicating module, and the value processing module are located.

9. The system of claim 8, wherein the HMI comprises a user interface configured to control the selecting module to select the variable parameters from the memory module.

10. The system of claim 8, wherein the values of the selected variable parameters are displayed on a screen of the HMI.

11. The system of claim 7, further comprising a second communicating module configured to transmit the values of the selected variable parameters from the central processing unit to the value processing module.

12. The system of claim 11, further comprising a driving device, the CPU and the second communicating module are located in the driving device.

13. A method for monitoring a processing machine, comprising:
- selecting a number of variable parameters from working parameters of the processing machine by a selecting module;
- setting an updating frequency of the selected variable parameters by an updating module according to the number of the selected variable parameters;
- converting the selected variable parameters into predetermined formats by a first communicating module;
- sending the converted selected variable parameters to, and gathering values of the converted selected variable parameters according to the updating frequency by, a central processing unit (CPU);
- determining whether all of the values of the selected variable parameters are gathered; and
- upon a condition that the gathering of all of the selected variable parameters values has completed, transforming the values of all of the selected variable parameters to display formats for presentation by a value processing module.

14. The method of claim 13, further comprising storing the working parameters of the processing machine by a memory module.

15. The method of claim 13, further comprising controlling the selecting module to select the variable parameters via a user interface of a human machine interface (HMI).

16. The method of claim 13, further comprising transmitting the values of the selected variable parameters from the CPU to the value processing module.

17. The method of claim 13, wherein the processing step comprises converting hexadecimal numbers of values of the selected variable parameters to decimal numbers.

18. The method of claim 13, further comprising displaying the values of the selected variable parameters on a screen.

19. The method of claim 13, further comprising, upon a condition that the gathering of all of the selected variable parameters values has not completed, repeating the converting step.

* * * * *